United States Patent
Zhan et al.

(10) Patent No.: US 6,585,466 B2
(45) Date of Patent: Jul. 1, 2003

(54) RAILCAR ANCHOR AND LOAD SNUGGER ARRANGEMENT

(75) Inventors: Mark Y. Zhan, Frankfort, IL (US); Stuart H. Thomson, Downers Grove, IL (US); David P. Crovetti, Campbellsport, WI (US)

(73) Assignee: Holland Company, Crete, IL (US)

( * ) Notice: Subject to any disclaimer, the term of this patent is extended or adjusted under 35 U.S.C. 154(b) by 0 days.

(21) Appl. No.: 09/808,392

(22) Filed: Mar. 14, 2001

(65) Prior Publication Data

US 2001/0036390 A1 Nov. 1, 2001

Related U.S. Application Data

(63) Continuation-in-part of application No. 09/441,848, filed on Nov. 17, 1999, now Pat. No. 6,494,651.
(60) Provisional application No. 60/134,098, filed on May 14, 1999.

(51) Int. Cl.[7] .................................................. B60P 7/03
(52) U.S. Cl. .................. 410/116; 410/106; 410/108; 410/109; 410/110; 410/112; 410/114; 410/115
(58) Field of Search ......................... 410/116, 115, 410/106, 108, 109, 110, 112, 113, 114; 105/355; 24/265 CD; 248/499

(56) References Cited

U.S. PATENT DOCUMENTS

| | | | | |
|---|---|---|---|---|
| 2,675,766 A | * | 4/1954 | Johnson | 410/112 |
| 2,733,670 A | * | 2/1956 | Sheesley et al. | 410/114 |
| 2,755,747 A | * | 7/1956 | Oakley | 410/108 |
| 2,989,010 A | * | 6/1961 | Wilkoff | 410/115 |
| 3,070,042 A | * | 12/1962 | Dunlap | 410/23 |
| 3,233,319 A | * | 2/1966 | Jensen et al. | |
| 3,604,365 A | * | 9/1971 | Wall | 410/108 |
| 3,685,778 A | * | 8/1972 | Berns | 410/108 |
| 4,062,297 A | * | 12/1977 | Snyder et al. | 410/113 |
| 4,266,897 A | * | 5/1981 | Jensen | 410/113 |
| 5,028,183 A | * | 7/1991 | Huddle et al. | 410/101 |
| 5,378,094 A | * | 1/1995 | Martin et al. | 410/112 |
| 6,315,509 B1 | * | 11/2001 | Nadherny et al. | 410/116 |

* cited by examiner

Primary Examiner—Stephen T. Gordon
(74) Attorney, Agent, or Firm—David C. Brezina; Barnes & Thornburg

(57) ABSTRACT

A railcar load securement apparatus uses an array of load securement anchors having bases adapted for strength and efficiency in mounting in a rail car, a plurality of vertical support members extending upwardly from a mounting base or bracket with a flush mounted anchor plate joining them, so that a plurality of tensioning members or straps can be readily mounted to retain cargo, but the anchor is flush to be unobstructive when unused. The alternative embodiment anchor is particularly adapted to installation with a new-floor, being a tube mounted anchor providing a strong, economical mounting where vertical clearance, and particularly angle, adjustment is not needed. Flexibility in load adaptation is provided for in that a number of different load capture arrangements can be utilized.

4 Claims, 5 Drawing Sheets

US 6,585,466 B2

RAILCAR ANCHOR AND LOAD SNUGGER ARRANGEMENT

CLAIM OF PRIORITY

Priority is claimed based on provisional application Ser. No. 60/134,098, filed May 14, 1999, and application Ser. No. 09/441,848, filed Nov. 17, 1999, now U.S. Pat. No. 6,494,651.

RELATED APPLICATION

This application is a continuation-in-part of application Ser. No. 09/441,848, filed Nov. 17, 1999, now U.S. Pat. No. 6,494,651.

BACKGROUND OF THE INVENTION

1. Field of the Invention

The invention uses alternatively, a retrofittable or new-floor—tube mounted—fabricated load securing anchor mounted to railcar beams, cross bearers, and bolsters. The anchor operates in conjunction with load securing straps arranged to apply securing loads on cargoes through a combination of straps, preferably straps in conjunction with resilient load securing pads.

2. Description of Related Art

The most common load securement method for railcars handling cargo such as large heavy items is to load the items on a railcar floor and secure the items with a variety of chains or straps typically using hooks to anchor the securement member (the chain or strap) and toggle and adjustment devices for tensioning.

Often the hooks are attached to the chain or strap and are anchored to eyes, or bars in pockets, or other structural members on the railcar. Additionally, specialized anchors or hooks having generally T-shaped members on the strap or chain fit into corresponding recesses in a railcar floor or, in the case of a flatcar, occasionally into a recessed pocket whereby the head of the "T" bears against a specialized anchor piece in the pocket.

Other load securement practices in the rail industry in the prior art included numerous other mechanical load securement methods such as: blocks, chocks, and specialized mechanical locks often varying depending on a specialized load.

The anchors shown here are preferably mounted in 4 to 10 (or more) anchors-per-car sets. The anchors are preferably mounted in pockets or recesses formed in line with current bulkhead floor track. If there is no floor track, then the anchors can be mounted anywhere along the wall, preferably above a major structural floor member.

SUMMARY OF THE INVENTION

A plurality of anchors are arrayed in association with a railcar floor, particularly being affixed to the railcar frame members that support the floor including longitudinal beams, longitudinal beams in association with riser and cross bearer members, and railcar bolsters.

Each anchor consists of a flat plate or channel with two to four (or more) elongated holes to which hooks engage. Preferably these are hooks mounted at the ends of adjustable tensioning straps. The anchors have flat plate or channel forms mounted flush with the car floor so that "slip-sheet" loads do not engage them. The anchors are also designed so that the holes will permit load securement bulkheads to engage the holes if a car is so equipped.

Typically, an array of floor anchors associated with each end and an additional pair associated with the car transverse center line—typically a box car door location—can be used to secure a variety of loads in combination with various railcar arrangements. These include using a plurality of vertically aligned foam pads or other resilient members acting against railcar ends and bulkheads, using opposed straps bearing against one another, particularly at the door position, or using strap tensioning against car ends in the absence of bulkheads. It is also advantageous to support coils on resilient, friction increasing horizontal pads.

The retrofittable embodiment uses height adjustable mounting to permit perfectly flush mounting in imperfectly level floors, or on distorted car frame members. The new-floor, tube mounted embodiment uses a short portion from a tube, mounted vertically, as the connecting member between the top plate and car frame.

DETAILED DESCRIPTION OF THE PREFERRED EMBODIMENT

Figure 1:
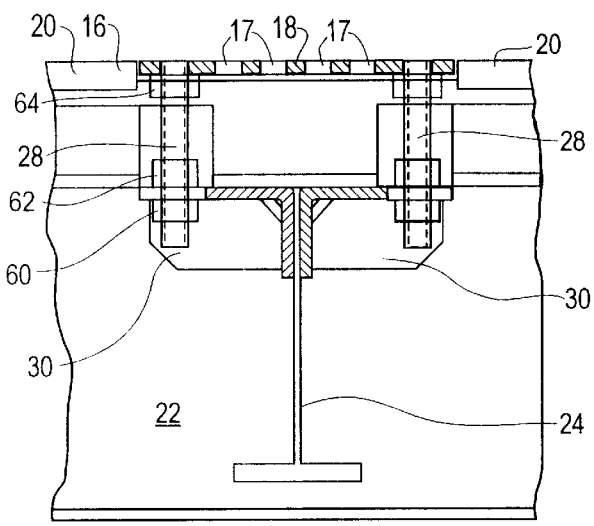
FIG. 1 is a sectional view, in a direction analogous to a side elevation of an anchor of the invention as mounted to a crossbearer.

A railcar 10 has a plurality of anchors or cleats 12, 14 arrayed in association with a floor 16. One form of anchor 12 is affixed to the railcar underframe members that provide strength for the car and also support the floor 16.

It will be noted that bulkhead track 20 customarily associated with a railcar floor 16 is shown in generally schematic form. Typically a pair of tracks 20 are recessed in the floor 16 to enable the fitting of bulkheads and removal or movement or adjustment thereof. The anchors 12, 14 are mounted flush with the insulated car floor 16 so that "slip-sheet" loads do not engage them.

The anchors 12, 14 are also designed so that their holes 17 in plate 18 will permit load securement bulkheads to engage the holes 17 if a car is equipped with bulkheads. This is enabled by locating the anchor in line with the current bulkhead floor track 20. If there is no floor track 20, then the anchors can be mounted anywhere along the car above a major structural floor member.

As will be seen in the discussion below, the general concept of applying flush anchors located in line with bulkhead tracks has evolved into a sophisticated structural arrangement that provides numerous technical advantages. In particular, arrangements for mounting have been developed that take advantage of uniquely configured standardized components and are adapted to fitting as original equipment in railcars of standardized configurations as well as the very significant advantage of retrofitting to existing cars.

Below floor 16, anchors 12 are fixed indirectly to the car's underframe members. For maximum strength these will be located in association with longitudinal beams or side sills 22 supporting cross bearers 24. In particular, anchor 12 has top plate 18 supported by rods 28 on brackets 30. Top plates 18 are formed to be mounted on rods 28 and to be alignable and fixed in position relative to the top surface of floor 16.

Anchor 14 is fitted with a base plate 32 itself mounted on bolster 34 near car end 36. This is also supported by bolts 38. The specific structure used for anchor 12 and 14, in particular their mounting and adjustment, will be described below.

A pair of anchors 14 is mounted at each car end 36. An additional pair of anchors 12 is associated with the car transverse center line typically where the doors are located. Because of the structure of the car underframe, anchors 12, 14 are attached differently, using, alternatively, brackets, 30 or base plates 32.

Figure 5:
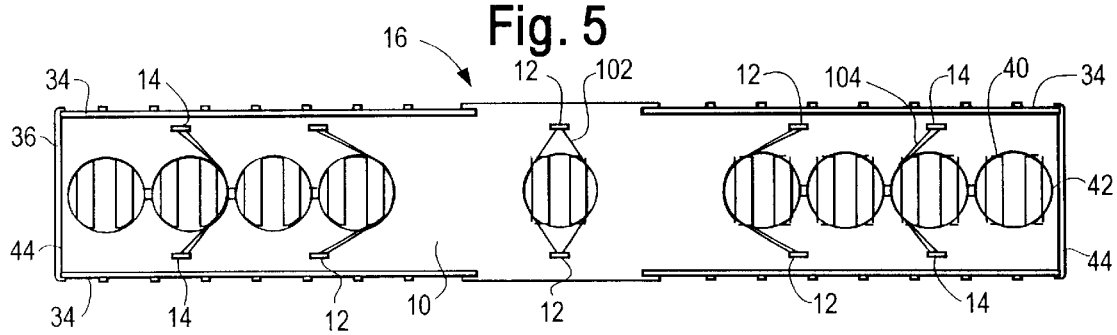
FIG. 5 is a top plan view of a railcar having the anchors of the invention mounted in a car without bulkheads.
Figure 6:
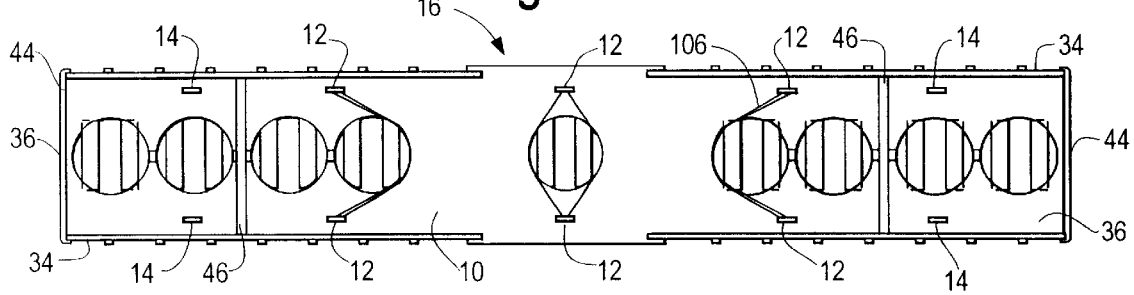
FIG. 6 is a top plan view of a railcar having the anchors of the invention mounted in a car with bulkheads

As shown in FIGS. 5–6, these anchors 12, 14 can be used to secure a variety of loads. Various railcar load securement arrangements use a plurality of resilient elastomeric pads 40 resting on floor 16 and blocking members or foam pads 42 acting between cargo rolls and against railcar end walls 44 and bulkheads 46, respectively. Preferably, antifriction pads 40 can be a masticated rubber material of a thickness of about ¼". Masticated rubber such as available from Alert Manufacturing specification No. 400 is a combination of rubber and random oriented fiber mixed in sheet form. It is often used in other applications such as wheel well openings, engine compartment barriers, gaskets, splash shields and other similar uses, however its increase in coefficient of friction as a base for cargo coils in rail cars is the advantageous feature used here.

Blocking members 42 can preferably be a resilient foam to help absorb buff and draw forces. These can be of numerous alternatives, including, for example, disposable polystyrene foam pads.

Figure 2:
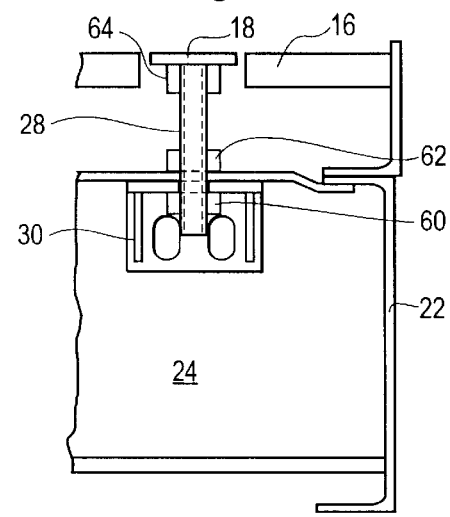
FIG. 2 is a sectional view, in a direction analogous to front elevation of an anchor of the invention as mounted to a crossbearer.
Figure 3:
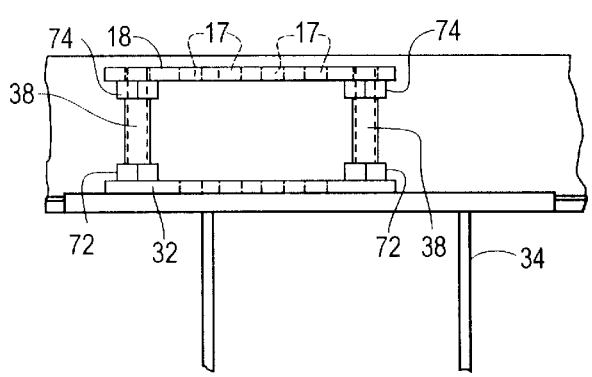
FIG. 3 is a sectional view, in a direction analogous to a side elevation of an anchor of the invention as mounted to a bolster.
Figure 4:
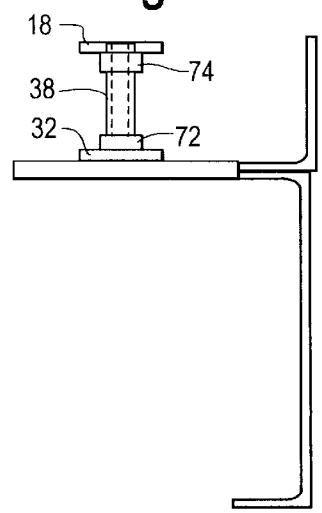
FIG. 4 is a sectional view, in a direction analogous to front elevation of an anchor of the invention as mounted to a bolster.
Figure 7:
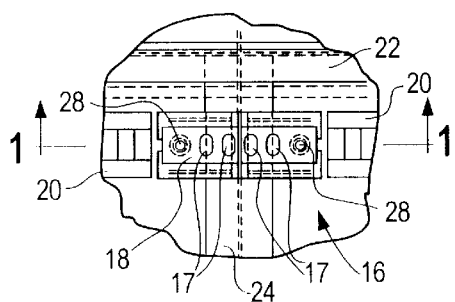
FIG. 7 is a top plan view of an anchor of the invention as mounted to a crossbearer.
Figure 8:
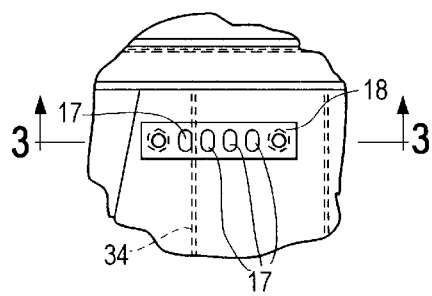
FIG. 8 is a top plan view of an anchor of the invention as mounted to a crossbearer.
Figure 12:
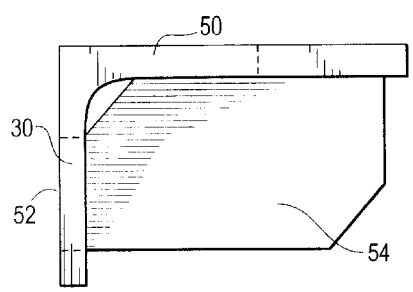
FIG. 12 is a side elevation of a mounting brace for an anchor of the invention.
Figure 13:
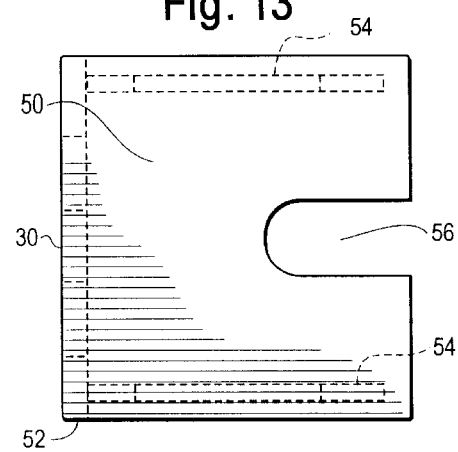
FIG. 13 is a top plan view of a mounting brace for an anchor of the invention.
Figure 14:
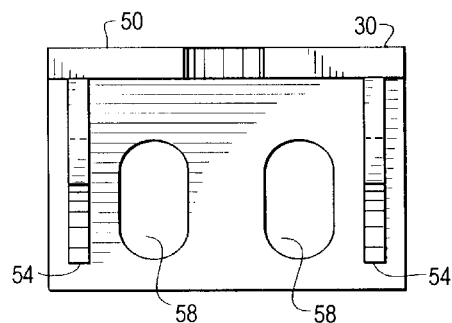
FIG. 14 is a front elevational view of a mounting brace for an anchor of the invention.
Figure 15:
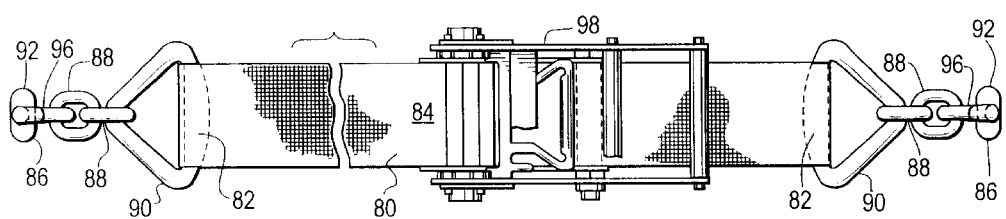
FIG. 15 shows a load securement strap used in the invention.
Figure 16:
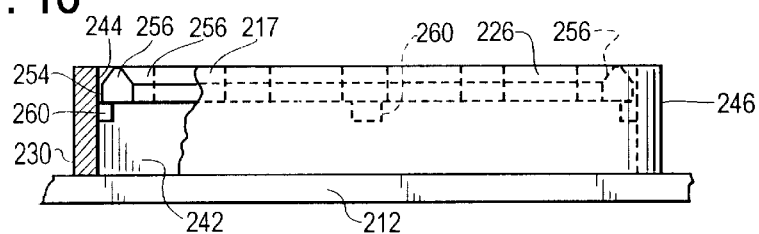
FIG. 16 is a partial sectional view of the tube mounted embodiment.
Figure 17:
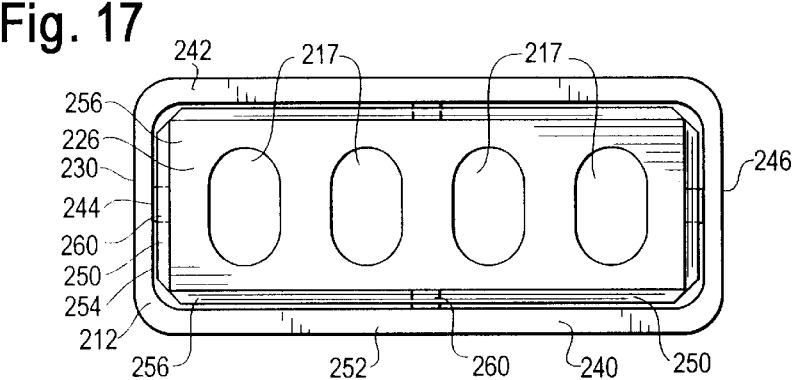
FIG. 17 is a top plan view of the tube mounted embodiment.
Figure 19:
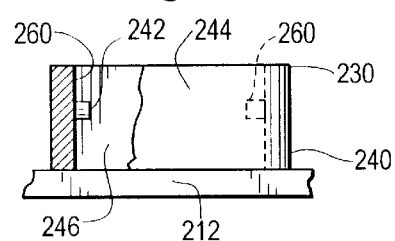
FIG. 19 is an end elevational view of the plate of the tube mounted embodiment.
Figure 18:
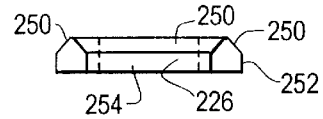
FIG. 18 is an end elevational view of the tube mounted embodiment.

FIGS. 1, 2 and 7 show the mounting of anchor 12 on brackets 30 and brackets 30 on crossbearer 24. FIGS. 12–14 show brackets 30 in greater detail. Bracket 30 has angled flanges 50, 52 supported by gussets 54. Flange 50 is formed to provide slot 56 which will receive rod 28. It will be seen that flange 52 is formed to have apertures 58 that provide some lightening and also provide for added edge surfaces which may be welded to crossbearer 24. Flange 52 is thus welded at locations appropriate to give adequate strength without undue heating and distortion of crossbearer 24.

Use of a threaded rod 28 will provide for the placement of a lower nut 60, a center nut 62 and a supporting nut 64. Rod 28 fits slot 56 preferably with center nut 62 fixed in a selected vertical position. Lower nut 60 can then be tightened to fix rod 28 to flange 52 in slot 56. Supporting nut 64 can then be rotated to raise it or lower it, so as to finely adjust the position of plate 18 relative to floor 16. Each nut 60, 62, 64 will preferably be welded in place once each of the described adjustments is made. Plate 18 can then be located for permanent positioning atop the pair of nuts 64.

Plate 18 has, in addition to load securement receiving apertures 17, rod apertures 66. Surrounding apertures 66 are recessed areas 68 preferably formed by machining such as by chamfering. Other methods of forming, whether by casting, stamping or machining could accomplish this, however chamfering is preferred. Areas 68 provide for placement of a welding bead to weld plate 18 to rods 28. The bead will be substantially below the top surface of the plate and can be easily ground flush without substantially reducing the strength of the joint.

FIGS. 3, 4, and 8–10 show the assembly and mounting of anchor 14. Base plate 32 is similar in plan form to top plate 18. Base apertures 70 conform in appearance to apertures 17 and can be formed in the same manufacturing steps. However, there is no need for either rod apertures 66 or chamfers 68 as plate 32 is welded to bolster 34. Apertures 70 provide for added edge area for welding, thus an extremely strong weld attachment can be made with minimal complexity in equipment, set up, work area size or the precision in the forming of a hole in floor 16. Bolts 38 have heads 72 welded to plate 32. The use of bolts provides the added mass and surface area of welded head 72 while the threads provide height adjustment in a manner analogous to that described above with respect to anchor 12. Height adjusting nuts 74 are used to position top plate 18 and the structure is then preferably welded.

Figure 9:
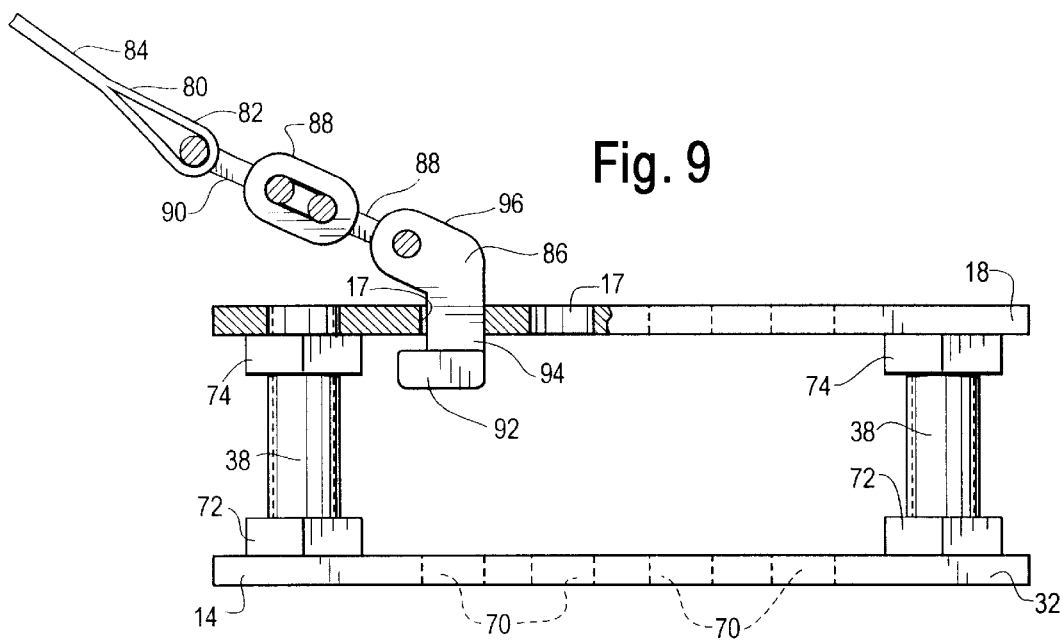
FIG. 9 is a front elevation of an anchor of the invention showing top plate attachment in partial sectional view.
Figure 10:
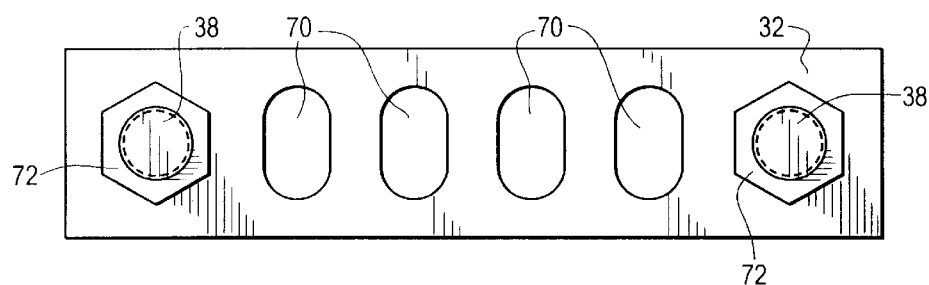
FIG. 10 is a top plan view of the base assembly of a bolster mountable anchor of the invention.
Figure 11:
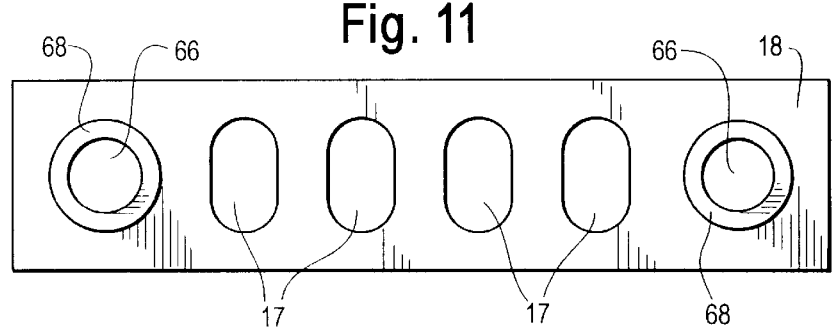
FIG. 11 is a top plan view of a top plate of an anchor of the invention.

Also shown in FIG. 9 is a securement strap 80 formed with loop 82 at the ends of a center web 84. Preferably strap 80 is secured to anchor 12, 14 with a hook device known in the industry as a "B" hook 86. The best strength and economy is obtained using a pair of links 88 for connection to the "B" hook 86 to interconnect with loop 82 through a "D" ring 90. "B" hook 86 has locking lobes 92 which fit through apertures 17, with stem 94 projecting through plate 18 to extend eye portion 96 in the direction of the load. The strap 80 is tensioned using a combination adjuster and toggle 98.

Various strap leads are disclosed and illustrated in FIG. 5 and FIG. 6. A pair of straps 80 can be used in a single coil capture arrangement 102, particularly advantageous at the door anchor location when a car 10 is fully loaded, but also usable for partial loads at the other stations. A pair of coils could be captured by a single strap 80 and compressed against a car end wall 44 in a double coil, end wall capture arrangement 104. This may also be used against a bulkhead 46 at arrangement 106 where the bulkhead 46 holds coils against wall 44. Generally, the anchors 12, 14 can retain a plurality of coils, preferably with a strap assembly 80 per coil, for each tensioning direction. Thus two straps are used in arrangements 104, 106 on a single side, while two straps at arrangement 102 are used, one at each side.

The alternative embodiment anchor is particularly adapted to installation with a new-floor being a tube mounted anchor providing a strong, economical mounting where vertical clearance, and particularly angle, adjustment is not needed.

Figure 20:
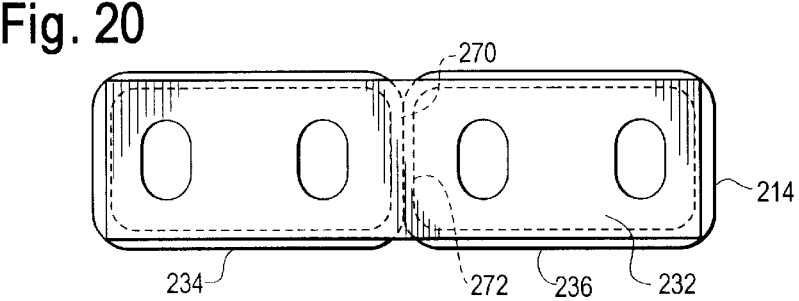
FIG. 20 is a top plan view of an alternative tube mounted embodiment.
Figure 21:
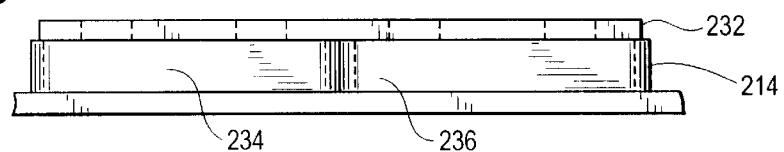
FIG. 21 is a partial sectional view of an alternative tube mounted embodiment.

Anchor 212 in FIGS. 16, 17, 18 and 19 has 4 holes and is particularly adapted for non-insulated rail cars, although for use on open top rail cars as well. Anchor 214, FIGS. 20, 21 is longer and uses a rectangular tube and welded flat plate with two holes. The first tube embodiment 212 is formed to have four holes 217 in a recessed plate 226 that fits inside the tube 230 and is shown in FIGS. 16–19.

The second tube embodiment 214 utilizes a longer four hole plate 232 that abuts the top of two tubes 234, 236 as shown in FIGS. 20, 21. Alternatively, a single plate with two or more holes that abuts the top of one tube, arranged at a height designed to be flush with the car floor, could also be used.

The tube mounted embodiments allow the anchor to be welded to the floor panels prior to floor installation, which reduces total installation costs. This is permitted because, unlike the retrofittable embodiment, vertical adjustment is neither enabled, nor needed.

An example of a typical installation of the tube mounted embodiment would be a non-insulated boxcar with a nailable steel floor or the equivalent. The load securement arrangements described could be advantageously adapted to such a car with end of car cushioning.

In this installation, either a 50' boxcar length or a 60' boxcar length utilizes 8 anchors (or 4 stations). All of the anchors 212 or 214 are located approximately ½" to 1" inward from the side wall of the car or directly against any side wall filler above the side sill. Anchors 212 are 4" wide and 10" long. The 10" length runs parallel to the wall of the car. Anchor 214, having two tubes, 234, 236, is 4" wide and 20" long.

Anchor 212 is formed from an approximately 1.625" to 1.750' high base tube 230. This tube 230 is cut from a formed length of steel tubing so that the described height tube 230 can be installed as described, with the loads distributed along seamless walls. Long walls 240, 242 and end walls 244, 246 comprise the structure of tube 230.

As a first step in installation, base tube 230 is welded from the inside only with down hand welding. Effectively, the tube walls define within them a weld aperture and the tube walls provide vertical support member supporting surfaces. In this manner, functions and advantages of the retrofittable embodiment are found in the new-floor mountable tube embodiment.

The ½" thick cover plate 226 is to be placed and welded inside the tube. The invention provides several advantages in this regard.

Plate 226 is formed with bevels 250 on the edges 252, 254. The bevels are at an angle of about 45°. Chamfered corners 256 provide an easily machined shape for clearance to fit inside the surfaces of walls 240, 242, 244, 246 considering that the tube 230 is typically formed with rounded corners.

Tabs 260 are attached to the inside surfaces of walls 240, 242, 244, 246 at a height that will enable plate 226 to be supported at a level flush with the top of the tube 230 and, as mounted, with floor 16. This provides primarily vertical support for plate 226 until it is welded in place.

The weld of bevels 250 proximate the inside surfaces of walls 240, 242, 244, 246 will fill the area therebetween and close up the gap between floor planks and any side wall filler. When finished, the cover plate 226 and floor 16 will be flush. In this manner, combining the tabs positioning the top plate at a selected height, and welding at the top edge of walls 240, 242, 244, 246 tube 230 and tubes 234, 236 perform the function of a plate supporting element.

A pair of anchors 212 or 214 (one station) is located at each end over the bolster 34 approximately 5'0" to 7'5" from the car end 36 inside. The teachings of the earlier retrofittable embodiment as to positioning and structural considerations in association with the car frame members (side sills 22, cross bearers 24, bolster 34) will be understood to apply to the tube versions, except as noted due to the mounting prior to floor installation.

Anchor 214 has plate 232 spanning two tubes 234, 236. It will be understood that a shorter plate could also be used with a single tube. Plate 232 is simply butt welded to the two tubes 234, 236, however the adjacent end walls 270, 272 if welded to plate 232, provide additional strength as a reinforcing web. Similarly, the butt weld of the alternative two hole version—effectively half of the two-tube version shown in FIGS. 20, 21, while not as strong as the beveled and filled version of FIGS. 16–19, will not have as many loads secured because it only has two holes, so there will be an inherent limiting factor. Of course, it should be recognized that the plates 226, 232 for either anchor 212, 214 could include two, three, four, or more openings, depending upon the application and the number of load securement device receiving apertures needed.

Care in fabrication and installation of the tube versions 212, 214 is important to preserve the advantages of the tube installation in order to avoid distortion of the panel during tube installation. After cutting out a 4"×10" hole or slot in the floor panel for the anchor, the floor panel should be supported at the ends.

The location of the anchor 212, 214 can be shifted longitudinally ±5" to allow positioning of the anchor. The next pair of anchors (1 station) in each end should be located directly above a cross-bearer 24 which is 5' to 8' from the bolster. Because the anchor is longer than the width of the cross-bearer 24, it may be necessary to support the floor panel at the cross bearer 24 and on either side. This support piece could be about 16" to 20" long, depending on the floor panels, cross-bearer 24 and side sill 22, and whether the 10" or 20" anchor, 212, 214 is used.

Each anchor 212, 214 can be subject to pulling forces through a web strap hook into the cover plate 236 that is 48,000 lbs. or more. Welding to the side sill 22 is critical. The majority of the forces are in the longitudinal direction toward the car door center. It will be understood that the locations of the tube anchors will correspond to the previously described retrofittable anchors 12, 14.

While the present invention has been disclosed and described with reference to particular embodiments thereof, it will be apparent, as noted above that variations and modifications may be made therein. It is also noted that the present invention is independent of the particular car. It is, thus, intended in the following claims to cover each variation and modification that falls within the true spirit and scope of the present invention.

In accordance with our invention we claim:

1. A method for restraining loads in a railcar, the method comprising the steps of:
   (a) securing a base formed from structural steel tubing to a railcar floor panel;
   (b) securing a top plate to the base, the top plate including a plurality of load securement device receiving apertures therein; and
   (c) providing securement straps accommodated by said load securement device receiving apertures to restrain the loads in the railcar.

2. The method in accordance with claim 1, wherein the step of securing a base to a railcar floor panel further comprises the steps of:
   (a1) providing a base including four contiguous side walls extending from a first end of said base to a second end with a plurality of mounting tabs secured to interior surfaces of said side walls, said side walls provided with rounded edges at least at said first end, and corners that are rounded both internally and externally; and
   (a2) welding said base to said railcar floor panel at said second end of said base.

3. The method in accordance with claim 2, wherein the step of securing a top plate to the base further comprises the steps of:
   (b1) providing a top plate configured to fit inside said base, with a bottom surface of said top plate, abutting mounting tabs, and a top surface of said top plate substantially flush with the rounded edges at the first end of said base, and
   (b2) providing a bevel around the perimeter of the top surface and chamfering the corners at approximately 45 degrees, thereby forming a chamfer, said bevel and said chamfer providing a weld aperture between the top plate and the interior surfaces of said base side walls; and
   (b3) welding the top plate to the base proximate the weld aperture.

4. The method in accordance with claim 1, wherein the step of providing securement straps further comprises the steps of:
   (c1) providing securement straps having associated "B" hooks accommodated by the load securement device receiving apertures of the top plate; and
   (c2) applying the securement straps to restrain the loads in the railcar.

* * * * *